United States Patent
Kasper, II

(10) Patent No.: US 7,299,285 B2
(45) Date of Patent: Nov. 20, 2007

(54) RESOURCE SHARING WITH DATABASE SYNCHRONIZATION

(75) Inventor: David J. Kasper, II, Aliso Viejo, CA (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 577 days.

(21) Appl. No.: 10/146,528

(22) Filed: May 15, 2002

(65) Prior Publication Data
US 2003/0217152 A1 Nov. 20, 2003

(51) Int. Cl.
*G06F 15/173* (2006.01)
*G06F 15/16* (2006.01)
*G06F 7/00* (2006.01)

(52) U.S. Cl. .................. 709/226; 709/248; 713/400; 707/8; 707/9

(58) Field of Classification Search .............. 709/226, 709/248; 713/400; 707/8, 9
See application file for complete search history.

(56) References Cited

U.S. PATENT DOCUMENTS

| | | | | |
|---|---|---|---|---|
| 5,243,596 A | * | 9/1993 | Port et al. .................. 370/231 |
| 5,790,895 A | * | 8/1998 | Krontz et al. ................. 710/64 |
| 6,023,493 A | * | 2/2000 | Olafsson ..................... 375/354 |
| 6,345,282 B1 | * | 2/2002 | Minyard ..................... 707/204 |
| 6,389,423 B1 | * | 5/2002 | Sakakura ..................... 707/10 |
| 6,499,031 B1 | * | 12/2002 | Hopmann et al. ............. 707/8 |
| 6,560,601 B1 | * | 5/2003 | Bjornerstedt .................. 707/8 |
| 6,611,849 B1 | * | 8/2003 | Raff et al. .................. 707/203 |
| 6,643,669 B1 | * | 11/2003 | Novak et al. ............... 707/201 |
| 6,694,337 B1 | * | 2/2004 | King et al. ................. 707/201 |
| 6,766,348 B1 | * | 7/2004 | Combs et al. .............. 718/104 |
| 6,889,333 B2 | * | 5/2005 | Lawrence et al. .......... 713/400 |
| 2002/0169775 A1 | * | 11/2002 | Meng ............................. 707/9 |
| 2002/0199003 A1 | * | 12/2002 | Sacca ......................... 709/228 |
| 2003/0093431 A1 | * | 5/2003 | Cooke et al. ............... 707/100 |
| 2003/0212681 A1 | * | 11/2003 | Kasper, II ...................... 707/9 |

* cited by examiner

*Primary Examiner*—Jungwon Chang
(74) *Attorney, Agent, or Firm*—Fogg & Powers LLC; David N. Fogg; David D. Freitag

(57) ABSTRACT

A system uses a resource locking token to allow various processes to have exclusive access to a system resource. The process that receives the token then requests that a local database be updated/synchronized with a master database. The process continues checking the synchronization status every time it gets the token. When the process receives the token and the synchronization is complete, the local database is accessed and the data is used in accessing the system resource. The token is then returned to the system.

1 Claim, 7 Drawing Sheets

RESOURCE SHARING WITH DATABASE SYNCHRONIZATION

TECHNICAL FIELD

The present invention relates generally to the sharing of system resources.

BACKGROUND

System resources, such as printers, processors, modems, memory, and even other applications, may be shared amongst various system applications/processes. For example, a communication process may share a modem resource with an email process.

However, typically only one system process can access the resource at any one time. If a lower priority process is using a system resource, other higher priority processes are locked out until the lower priority process has relinquished control.

Systems that employ databases can have one master copy of the information contained in the database and multiple "local" copies. The local copies may be exact copies of the master database information or the local copies may be a subset of the information that is stored in the master database.

In order for the local databases to have the most up-to-date information from the master database, the local databases must be periodically synchronized with the master database. For example, if the master database is updated with new information, the local databases typically will not have this new information until the databases are synchronized.

One problem with synchronizing databases in a system is that a lower priority process may have a system resource locked while waiting for a local database to synchronize. While the lower priority process has the system resource locked, higher priority processes cannot use the resource. There is a resulting need in the art for a prioritized system that enables system processes having different priority levels to share a system resource.

SUMMARY OF THE INVENTION

The embodiments of the present invention encompass resource sharing and database synchronization. The method first receives exclusive access to the resource. Synchronization of a local database with a master database is then requested. The method then checks the synchronization status until synchronization is complete. Data from the local database is then read and the shared resource is accessed with the data. The exclusive access to the resource is then returned to the controlling system for distribution to other processes.

DETAILED DESCRIPTION

The embodiments of the resource sharing with database synchronization of the present invention provide prioritized access to a shared system resource. Additionally, a low priority process does not lock out other higher priority processes from the resource while waiting for a local database to be synchronized.

Subsequent discussions of the various databases of the embodiments of the present invention refer to synchronization of the databases. Synchronization and updating of the databases are considered to be substantially similar tasks and the terms can be used interchangeably.

Figure 1:
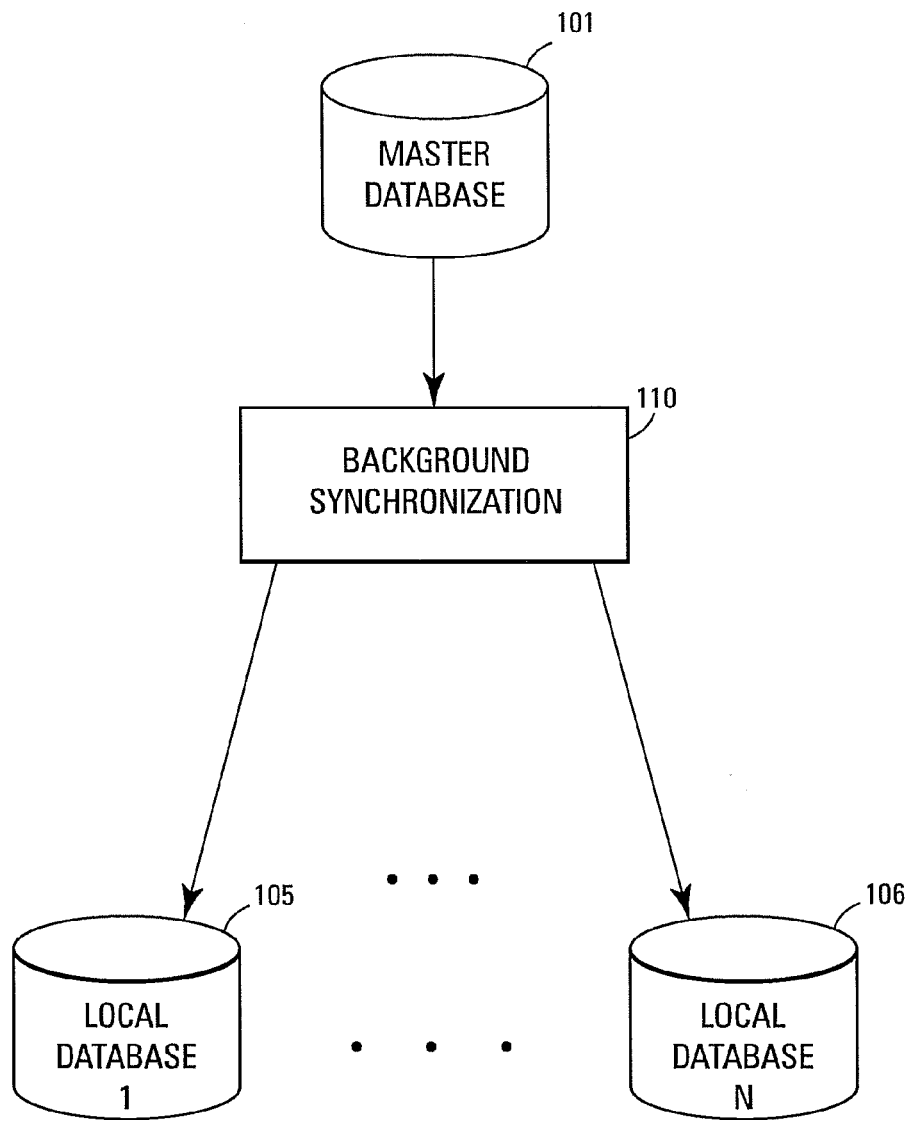
FIG. 1 shows a block diagram of one embodiment of a distributed database system of the present invention.

FIG. 1 illustrates a block diagram of one embodiment of a distributed database system of the present invention. The master database (101) stores information/data for later retrieval. In one embodiment, the master database (101) stores statistics regarding a quality of service provided over a communication line (e.g., a digital subscriber line (DSL)).

Each statistic in the database may be referred to as an object or element. For example, in one embodiment, if the data stored in the database includes statistics on the quality of service of a communication link, one object stored in the database is a bit error rate for each link that is coupled to the master database. Other types of objects/elements include link downtime, link bit rate, and subscriber information.

In alternate embodiments, the database is used for storing information that is not related to communication link quality of service. In such embodiments, the objects/elements are not communication link related. The types of objects/elements stored in the database do not limit the present invention.

The master database (101) is coupled to multiple local databases (105-106). The embodiment of FIG. 1 illustrates these databases as local database 1 (105) through local database N (106). The databases may be of any size.

The local databases (105-106), in one embodiment, have the capacity to hold a substantially equivalent copy of the data that is stored in the master database (101). In another embodiment, the memory capacity of the local databases (105-106) is such that only a smaller subset of the data stored in the master database (101) will fit in the local databases.

The databases (101, 105, and 106) of the present invention are stored in some form of memory. In one embodiment, the database memory is of the type used for temporary storage of data such as random access memory (RAM). The database memory may also be of the type used for permanent storage of data such as read only memory (ROM), programmable read only memory (PROM), and/or memory cards.

Other types of database memory may include semiconductor, magnetic, optical, or storage media. The storage media memory can include hard disk drives, floppy disk drives, optical drives, removable solid-state memory cards, or any other type of storage media. The storage media may be fixed or removable from a database system.

The master database (101) and the local databases (105-106) are coupled through a background synchronization block (110). As described subsequently, the background synchronization block (110) provides a method by which the local databases (105-106) are updated with data from the master database (101).

In one embodiment of the present invention, the objects stored on the local databases each have a flag that indicates a synchronized or not synchronized status of the object. In one embodiment, the flag indicates either "pending" or "ready".

The "pending" flag indicates that the object has not been synchronized with the master database and, therefore, may not be accurate and up-to-date. The "ready" flag indicates that the object has already been successfully synchronized with the master database.

In one embodiment, the "pending" and "ready" flag takes the form of a single bit of data. For example, if the flag is a logic 0, the flag is set for "pending". If the flag is a logic 1, the flag is set for "ready". Other embodiments may use other flags to indicate the "pending" and "ready" states.

The "pending" and "ready" states are for illustration purposes only. Alternate embodiments may use other states that perform substantially the same function as the states of the present invention. For example, in one embodiment, a "pending" flag is set by a bit set to a logical 1. If that bit is not present, then the object has been synchronized and is considered "ready" for processing.

Figure 2:
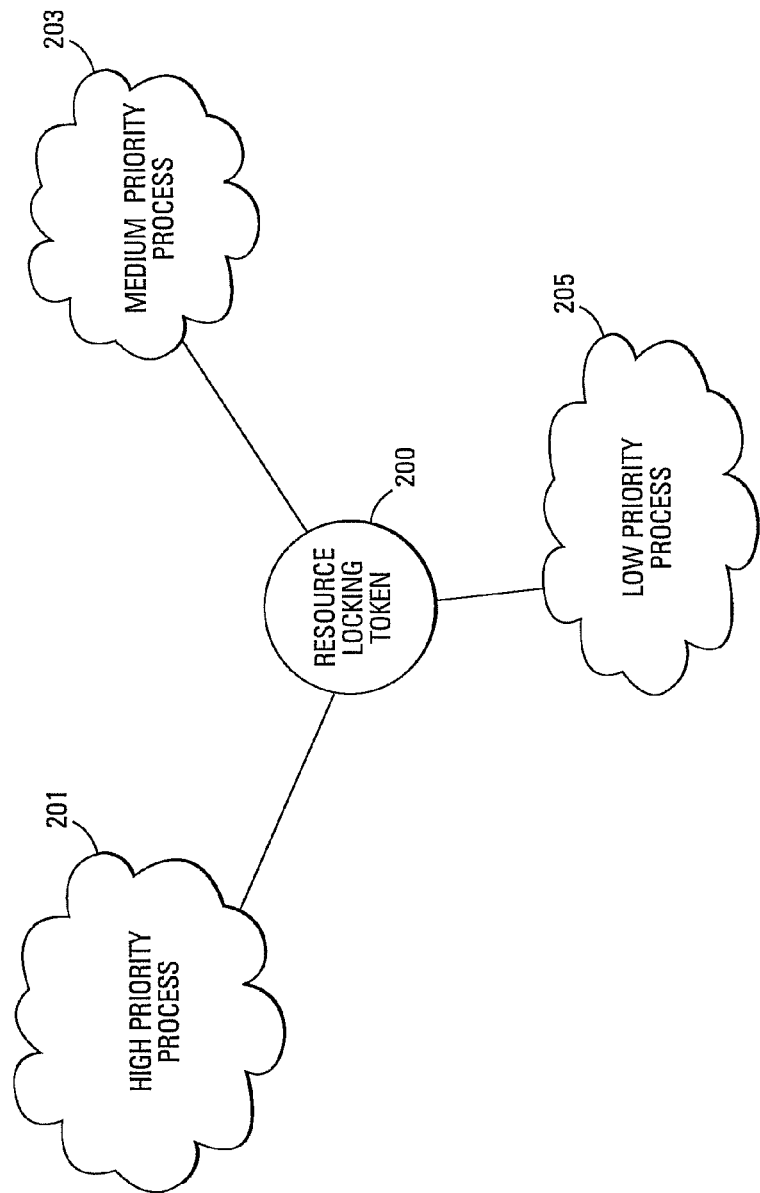
FIG. 2 shows a flow diagram of one embodiment of a resource sharing system of the present invention.

FIG. 2 illustrates a flow diagram of one embodiment of a resource sharing system of the present invention. In this embodiment, the system has a high priority process (201), a medium priority process (203), and a low priority process (205). Additionally, a resource locking token (200) is passed by the operating system among the various processes of the system.

The various processes (201, 203, and 205) of the embodiment of FIG. 2 can be any application being executed by a system controller and/or a local controller. In an embodiment where a data port is the shared resource, a high priority process may be a communication sub-routine that scans for input data from a modem. A medium priority process may be an application that outputs data through the data port. A low priority process may be an application that scans the data port for communication line statistics and outputs to the data port statistics from a local database.

The above-described processes are for illustration purposes only. There may be any number of processes that can take the form of any process/application that is executable by a controller. Additionally, while the low priority process is illustrated as accessing a local database, alternate embodiments have other priority processes accessing the local database.

The resource locking token (200) may take the form of a binary semaphore or some other type of token. In one embodiment, the token (200) is controlled by the operating system. The operating system determines the priority of each process (201, 203, and 205) and passes the token to a particular process based on that priority. The higher priority processes receive the token before the lower priority processes.

Once a particular process has the token, other processes are locked out from accessing the resource. When the process is finished with the resource, the token is passed back to the operating system in order to be passed to another process.

The token passing may be accomplished in various ways. In one embodiment, the operating system assigns a portion (e.g., a bit) of a memory cache to each process for one particular resource. When the bit for a particular process is set, that process now has access to the resource to the exclusion of the other processes. Once that bit has been reset and the bit for another process has been set, the token has been passed to that process and it now has exclusive use of the resource.

This token passing process is for illustration purposes only. Alternate embodiments accomplish the token passing in other ways.

Figure 3:
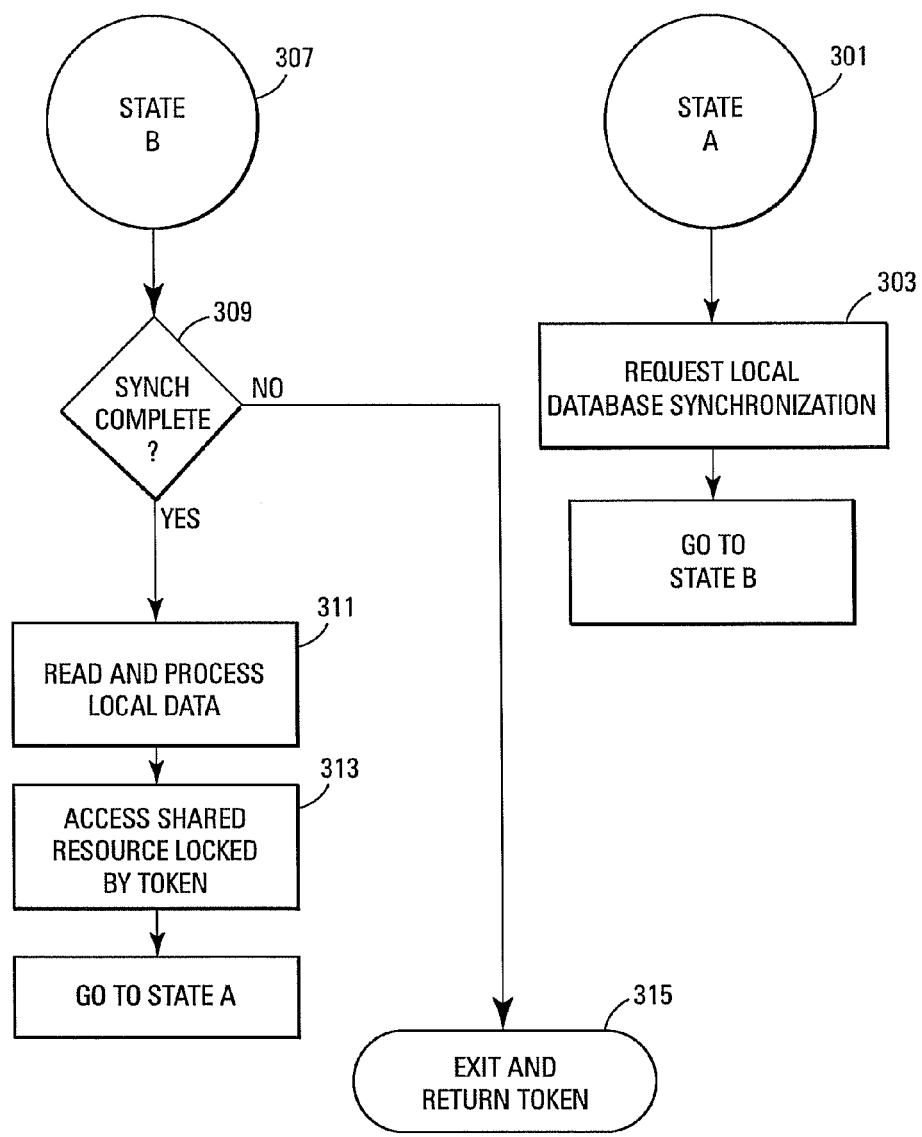
FIG. 3 shows a state diagram of one embodiment of a resource sharing and database synchronization method of the present invention.

FIG. 3 illustrates a state diagram of one embodiment of a resource sharing and database synchronization method of the present invention. The method of FIG. 3 is initiated only when the initiating process has the token.

In the subsequently discussed embodiment, the resource sharing and database synchronization method is initiated from the low priority process (205) of the embodiment of FIG. 2. Alternate embodiments initiate the resource sharing and database synchronization method from other priority processes.

Figure 4:
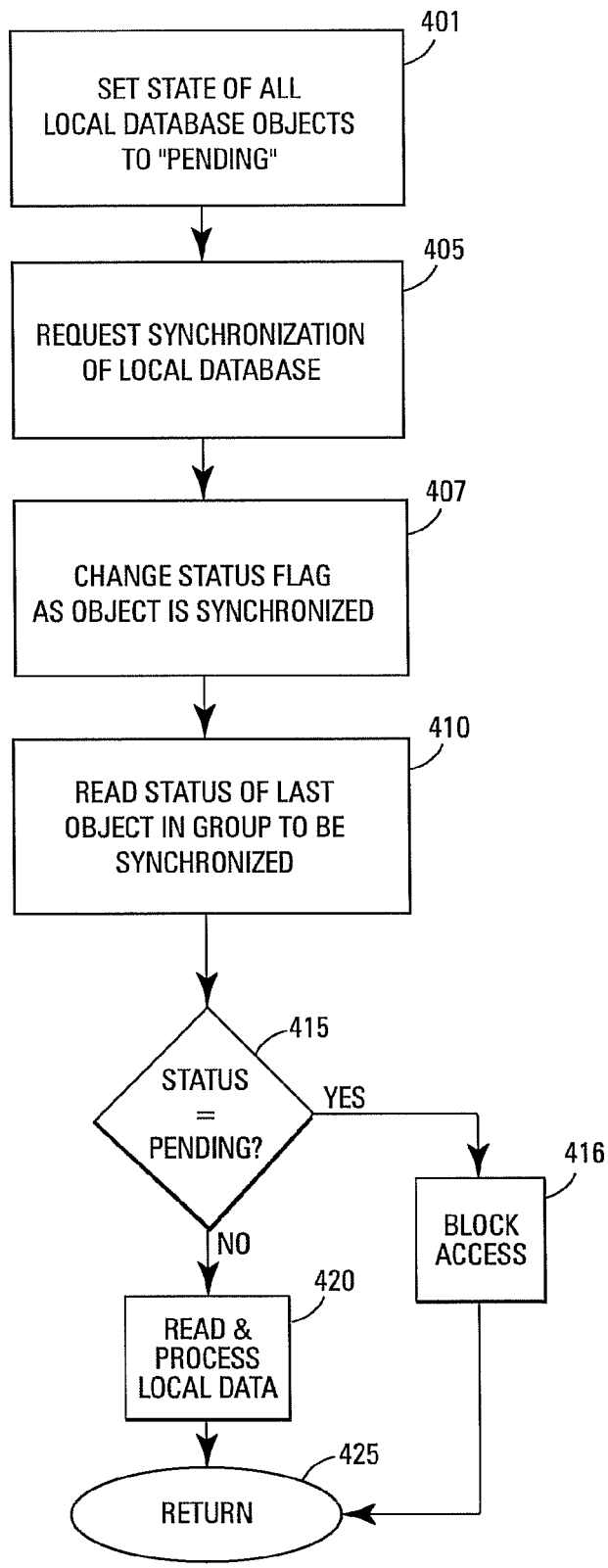
FIG. 4 shows a flowchart of one embodiment of a background synchronization method of the present invention.

The token sharing method is initiated by the low priority process at state A (301) where a request to synchronize a local database with a master database is requested (303). One embodiment of a background synchronization method of the present invention is illustrated in FIG. 4 and discussed subsequently.

The method then goes to state B (307) where it is determined if the background synchronization of the local database has been completed (309). If the synchronization has not been completed, the process exits and the low priority process returns the token (315) for use by another higher priority process.

If the synchronization process has been completed, the process reads and processes the data from the local database (311). The type of processing performed depends on the function performed by the low priority process that is accessing the local database. In one embodiment, the low priority process is responsible for tracking error statistics of a communication link.

The low priority process then accesses the shared resource that is locked (313) to other processes. If the shared resource is a data port, as discussed above, the low priority process accesses the data port (313) in order to transmit data from the local database through the modem or other device coupled to the data port.

The method then returns to state A (301) where the entire method is repeated. For example, the database synchronization is requested (303), a check for synchronization is done (309), and the token is returned (315) for use by the next process.

FIG. 4 illustrates a flowchart of one embodiment of a background synchronization method of the present invention. The process that has the token and, therefore, access to the shared resource initiates this method.

In one embodiment, the local databases start off empty and the synchronization method loads the requested objects into the requesting local database memory. In another embodiment, the local databases already have objects in memory that are overwritten by objects requested from the master database.

While the subsequently described method refers to one local database, the same method may apply to each of the 1-N local databases. One local database is used for illustration purposes only.

The status flags of any of the local database objects are set to "pending" (401). A request is made for synchronization of the local database with the master database (405).

In one embodiment, in the request for synchronization (405), the request is to synchronize the entire local database or only a desired group of objects. For example, the group of objects to be synchronized may include only the bit error rate and the down time and not the other objects stored in either the master or local databases.

In one embodiment, the objects to be synchronized are downloaded from the master database to the local database. These downloaded objects then replace the older objects in the local database.

In another embodiment, the objects to be synchronized are operated on by a process that determines whether the local database objects are more recent or whether the master database objects are more recent. If the local objects are the most recent, these objects overwrite the objects in the master database. If the master database objects are more recent, the objects from the master database overwrite the older objects in the local database. If the objects to be synchronized are not already present in the other database, they are written to that database.

The local database, in one embodiment, requests synchronization using a request command from a card controller that is transmitted over a data bus. Such a configuration is discussed subsequently with reference to FIG. 5.

As the objects are transferred to the local database, their associated status flags are changed (407) to "ready" or some equivalent indication. The status flag of the last object in the group of objects to be synchronized is checked (410). If the status flag is "pending" (415), read access to the local database is blocked (416) so that objects that have not been synchronized cannot be read and processed.

In one embodiment, this blocking is accomplished by a memory read subroutine not permitting access until the last object has a "ready" flag. Other techniques, that are well known in the art, may be used to block access to the memory until the database is synchronized. The present invention is not limited to any one technique. The method then returns (425) to the database access method that initiated the request for synchronization.

In an alternate embodiment, each of the status flags of each synchronized object is checked. If any of the objects to be synchronized still has a "pending" flag set, access to the local database is blocked and the method returns to the initiating method.

With the synchronization method of the present invention, a controller running various processes is not tied up waiting for the synchronization method to be completed only periodic checking is required to determine the status of the synchronization.

If the status flag of the last object, or all the objects, in the group is checked and found to be set to "ready" (415), the objects in the local database are read and processed as required (420).

Figure 5:
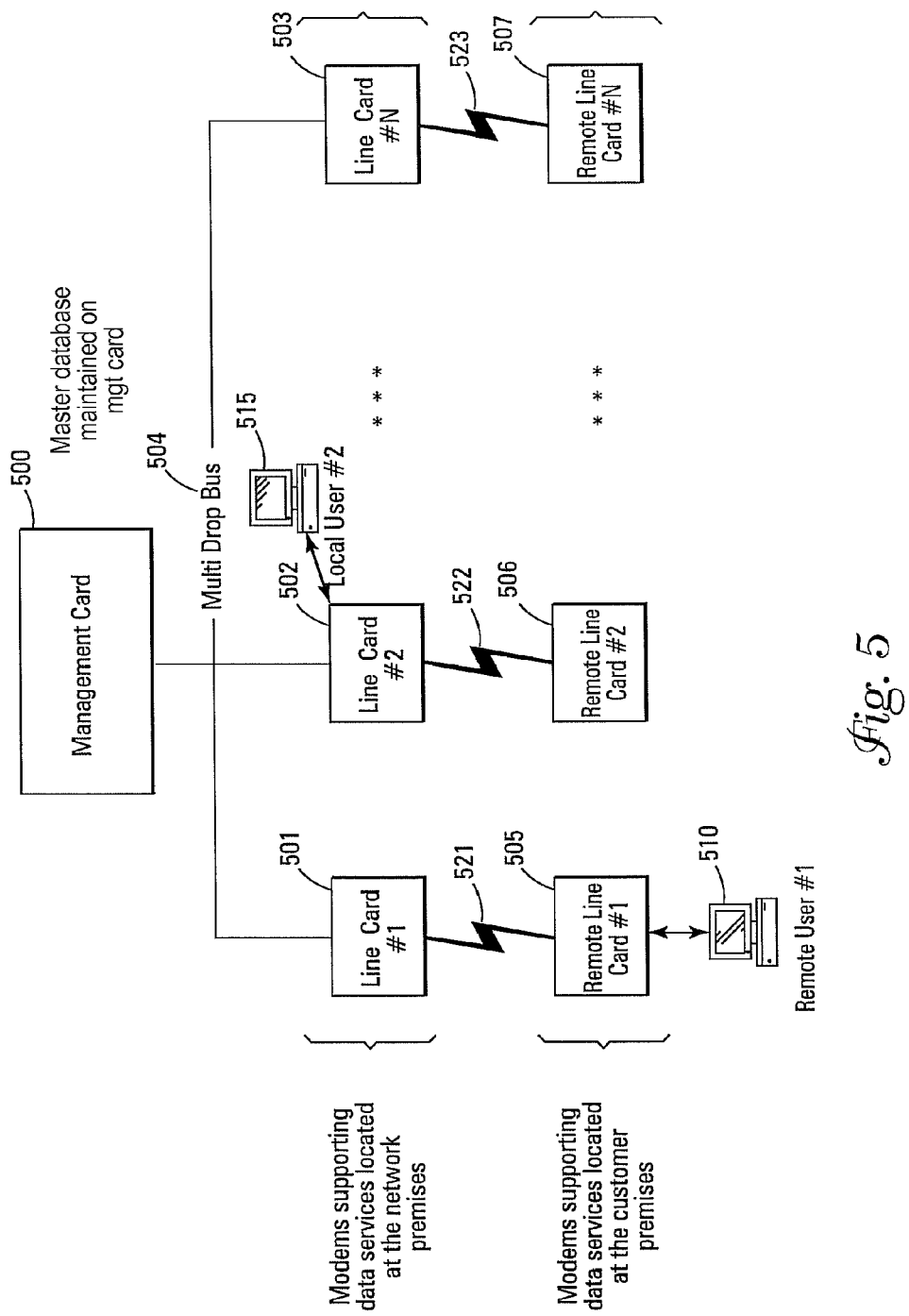
FIG. 5 shows a block diagram of one embodiment of a system of the present invention.

FIG. 5 illustrates a-block diagram of a typical communication system in accordance with the background synchronization method of the present invention. The system of FIG. 5 is for illustration purposes only and does not limit the synchronization method to this particular type of system.

This system includes a management card (500) that is responsible for controlling the system of the present invention. In one embodiment, the master database is maintained on the management card (500) or other type of controller card. One embodiment of the management card (500) is described subsequently with reference to FIG. 6.

Line cards 1-N (501-503) are coupled to the management card (500) through a multi-drop bus or backplane (504). In the communication system embodiment, line cards 1-N (501-503) are modems that support data services that are provided to customers. The local databases of the present invention are maintained on the line cards. In one embodiment, the resource sharing and database synchronization is performed on each line card (501-503).

Each line card (501-503) is coupled to a communication link (521-523 respectively). The communication link may be a T1 line, a DSL line, a wireless link, or any other form of communication link depending on the type of data services provided by each line card. The communication system of the present invention is not limited to any one form of communication link.

The communication links (521-523) couple their respective line card to a remote line card (505-507) that is located at the customer's site. Remote line cards 1-N (505-507) are the same type of modem as the respective line card to which it is coupled. In other words, if line card 1 (501) is a DSL modem, remote terminal 1 (505) is a DSL modem.

In one embodiment, a remote user computer (510) is coupled to the remote line cards (505-507). The remote user computer (510) can then communicate over its communication link (521) with the network to which the system is connected.

In one embodiment, a local user computer (515) is coupled to one or more of line cards 1-N (501-503). The local user computer (515) enables a computer operator to interface with the system for maintenance and operation of the system. Both a local user computer (515) and a remote user computer (510) can access their respective local databases to which they are coupled. The local and remote user computers can then initiate the background synchronization method of the present invention.

The system of the present invention is not limited to a communication system as illustrated in FIG. 5. Any system that can execute an embodiment of the resource sharing and database synchronization method are encompassed by the present invention.

Figure 6:
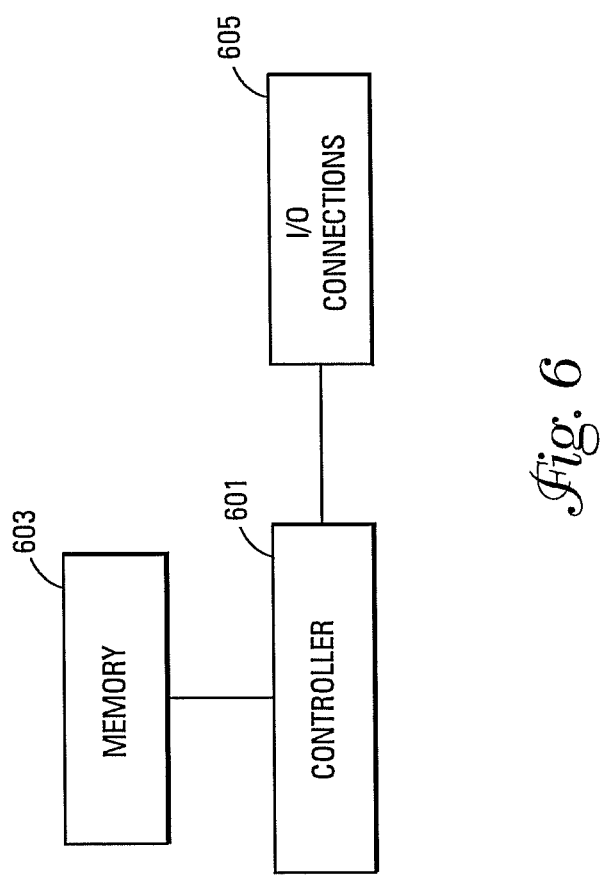
FIG. 6 shows a block diagram of one embodiment of a management card of the present invention.

FIG. 6 illustrates a block diagram of one embodiment of a management card of the present invention. In this embodiment, the management card has a controller (601) that controls the operation of the management card as well as the operation of the communication system. The controller (601) may be a microprocessor, a microcontroller, or some other form of control circuitry.

In one embodiment, the controller (601) of the management card executes an embodiment of the resource sharing and database synchronization method. In such an embodiment, the management card controller (601) is responsible for passing the token that controls access to the shared resource.

Memory (603) is coupled to the controller (601) to store data for use by the controller (601). The memory (603) might be any of the types described above as the database memory. In this embodiment, the memory (603) stores the master database of the present invention.

Input/Output (I/O) connections (605) enable the controller (601) to communicate with the other cards of the system. The I/O connections (605) might include circuit card contacts such as connectors, circuit card fingers, or other types of connections.

Figure 7:
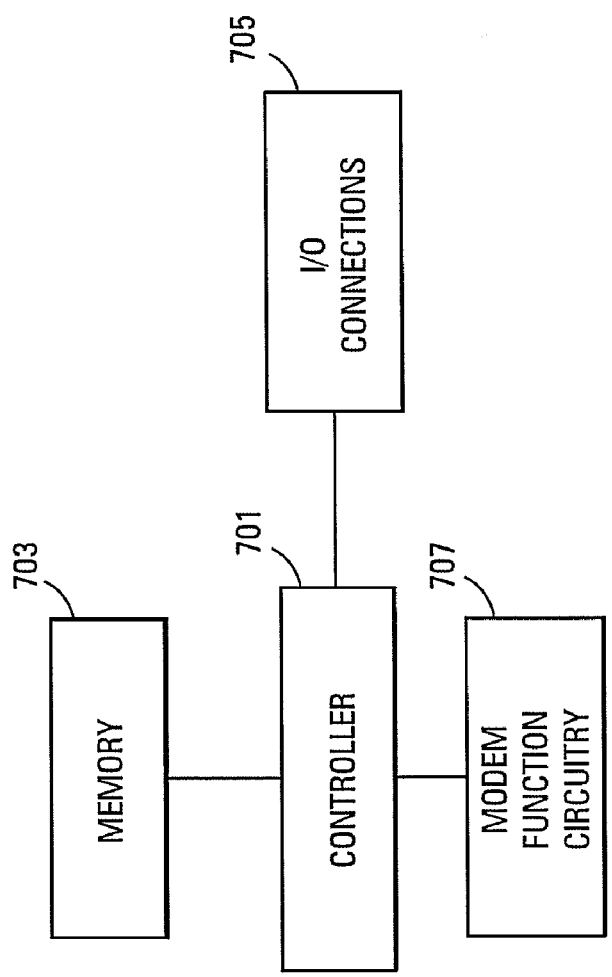
FIG. 7 shows a block diagram of one embodiment of a line card of the present invention.

FIG. 7 illustrates a block diagram of one embodiment of a line card of the present invention. In this embodiment, the line card has a local controller (701) that controls the operation of the line card communication circuitry. The controller (701) may be a microprocessor, a microcontroller, or some other form of control circuitry.

In one embodiment, the local controller (701) is responsible for passing the token that controls access to the shared resource.

Memory (703) is coupled to the controller (701) to store data for use by the controller (701). The memory (703) might be any of the types described above as the database memory. In this embodiment, the memory (703) stores the local database(s) of the present invention.

Input/Output (I/O) connections (705) enable the line card to communicate with the management card as well as other cards of the system. In one embodiment, the I/O connections (705) include circuit card contacts such as connectors, circuit card fingers, or other types of connections.

Modem function circuitry (707) provides the line card with the ability to communicate over communication links with other modems. Modem operation is well known in the art and is not discussed further. The modem function circuitry (707) is coupled to the controller (701) and enables the local communication system to communicate over the communication links with remote modems that are coupled to computers.

In summary, the embodiments of the resource sharing and database synchronization of the present invention provide a system that has a shared resource with the ability to minimize the time that higher priority processes are locked out of the resource. Therefore, high priority and critical processes/applications are less likely to become suspended. Additionally, since system resources can be shared, system efficiency increases.

Numerous modifications and variations of the present invention are possible in light of the above teachings. It is therefore to be understood that within the scope of the appended claims, the invention may be practiced otherwise than as specifically described herein.

What is claimed is:

1. A system for resource sharing and database synchronization, the system comprising:

a plurality of application processes, each process having an assigned priority level and sharing a resource locking token, at least one process having a low priority level;

an operating system that controls distribution of the resource locking token among the plurality of processes, the resource locking token being passed to a first process of the plurality of processes in response to the assigned priority level;

a local database that is synchronizable with a master database; and a local controller capable of executing the plurality of application processes such that a low priority process receives the resource locking token, requests synchronization of the local database with the master database after receiving the resource locking token, returns the resource locking token to the operating system if synchronization is not complete, accesses the local database by the low priority process after synchronization is complete, accesses the resource by the low priority process in response to data from the local database, and returns the resource locking token to the operating system.

* * * * *